(No Model.) 3 Sheets—Sheet 2.
G. R. KING.
SAND AND GRAVEL SCREEN AND WASHER.
No. 551,772. Patented Dec. 24, 1895.
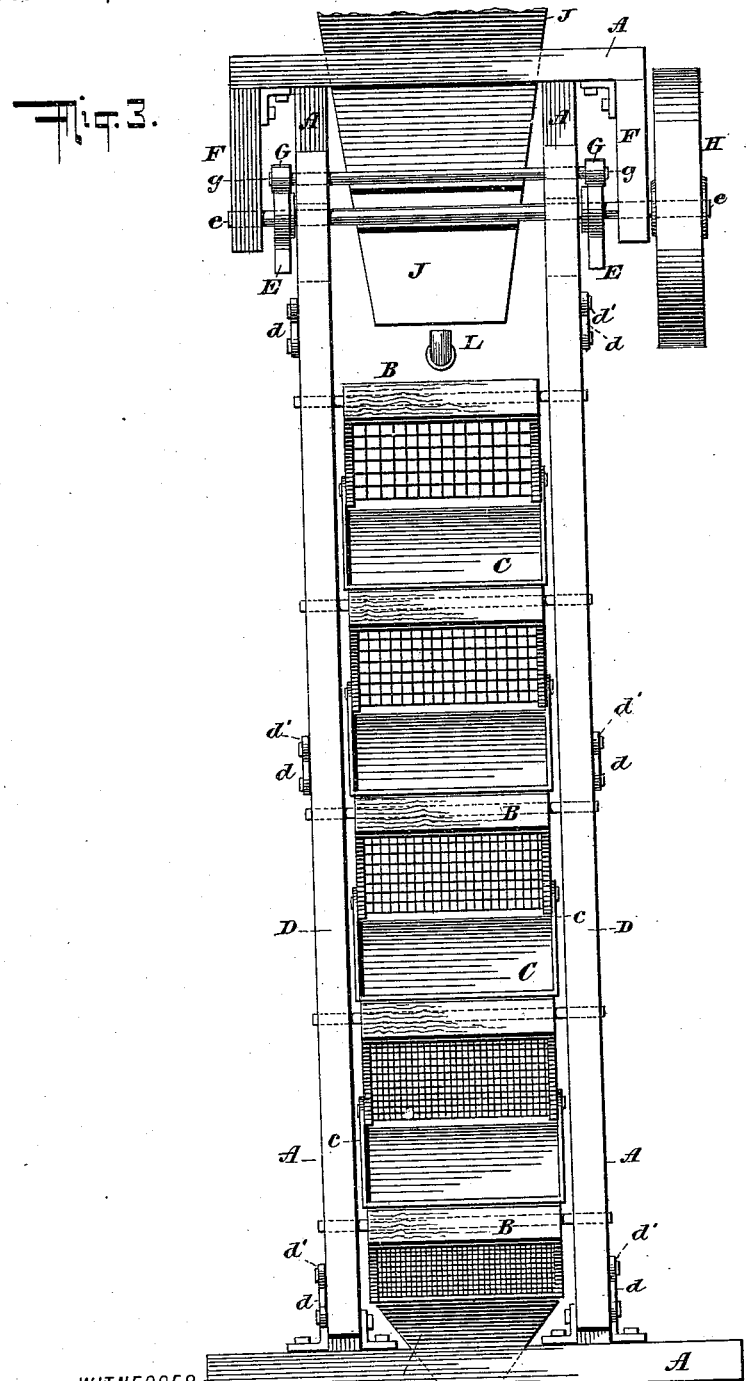
WITNESSES: INVENTOR
Gustave Dieterich George R King
John Kehlenbick BY
F. G. Johnson
ATTORNEY

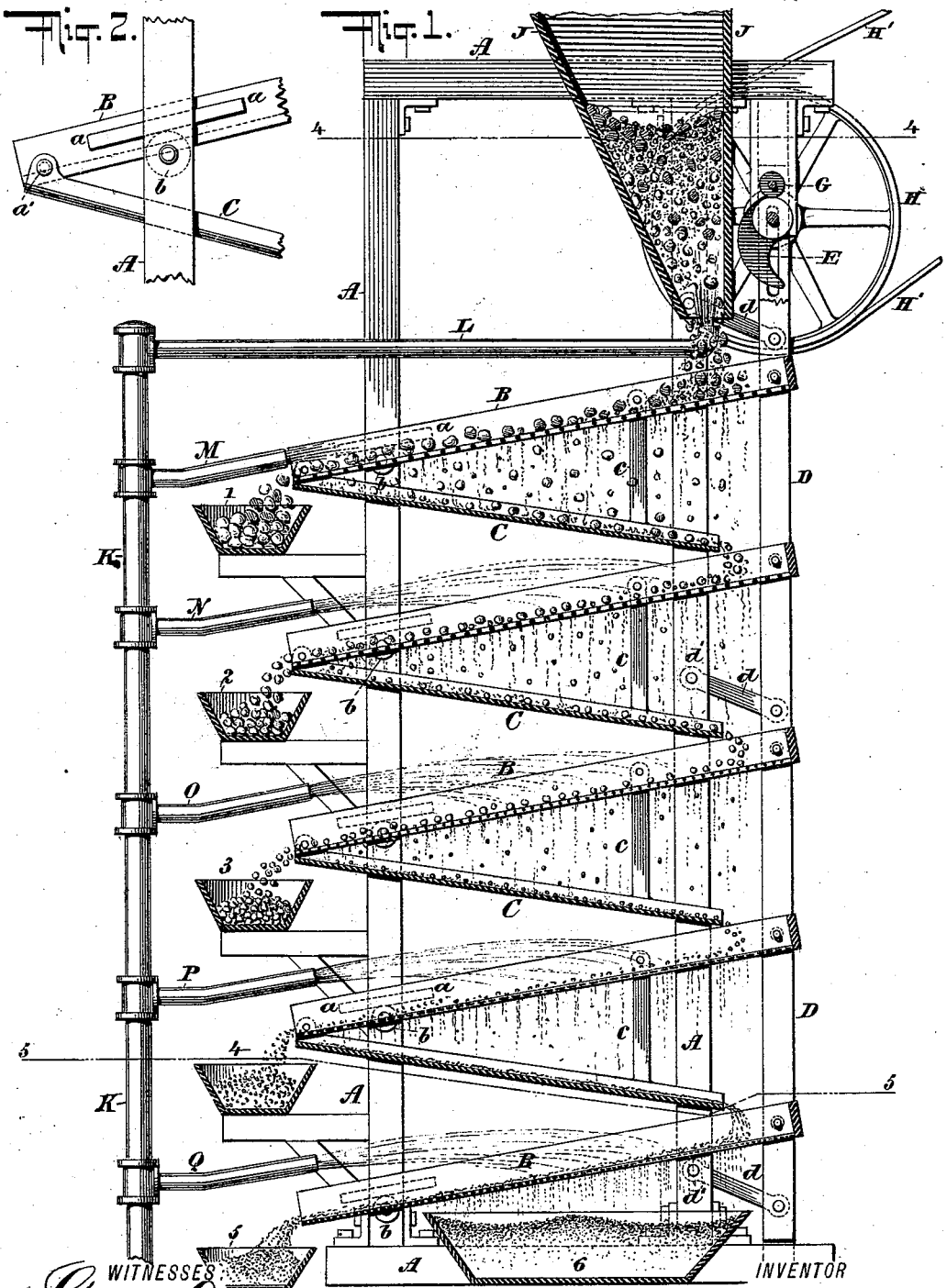

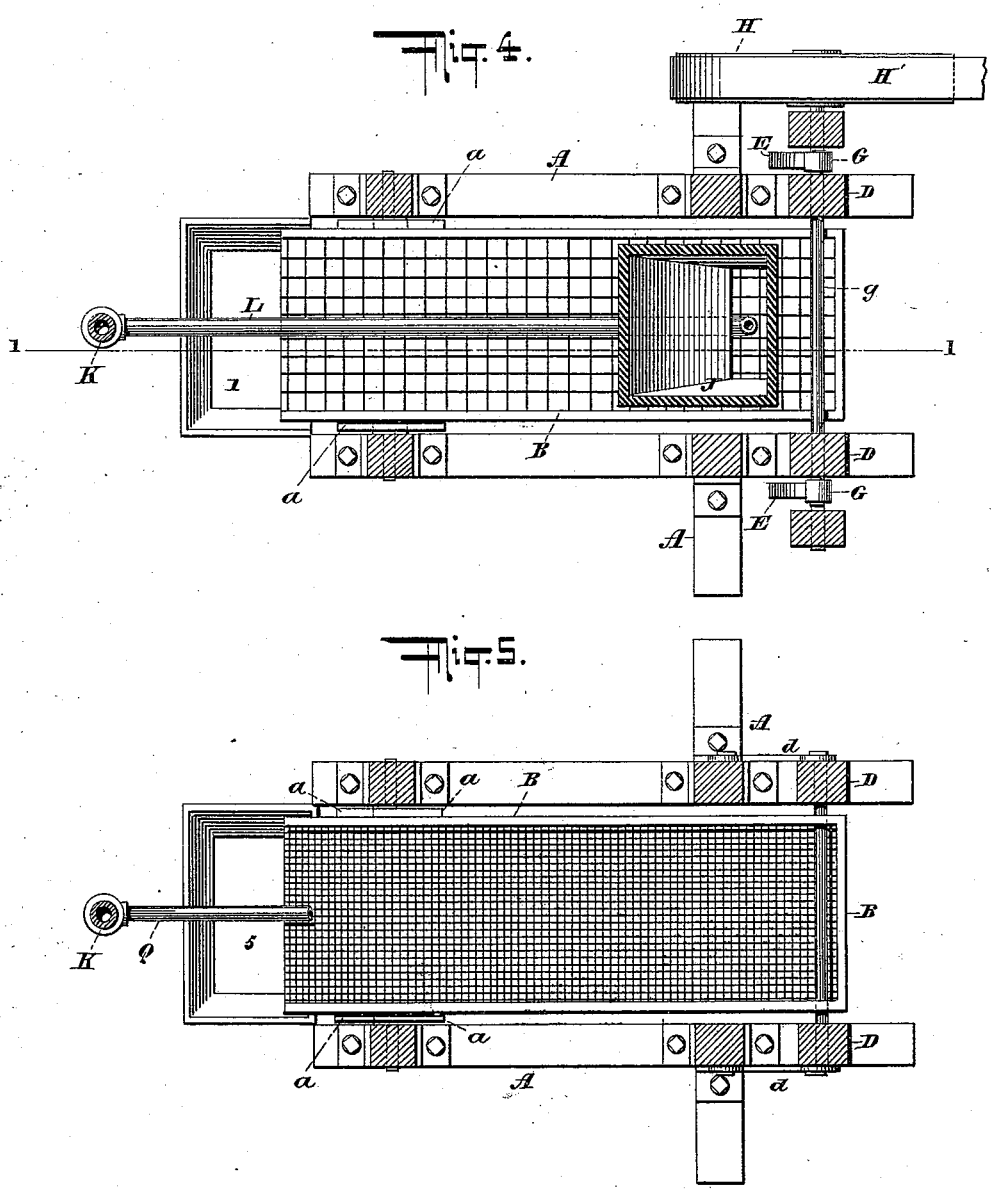

UNITED STATES PATENT OFFICE.

GEORGE R. KING, OF NEW BRIGHTON, NEW YORK.

SAND AND GRAVEL SCREEN AND WASHER.

SPECIFICATION forming part of Letters Patent No. 551,772, dated December 24, 1895.

Application filed September 24, 1895. Serial No. 563,511. (No model.)

*To all whom it may concern:*

Be it known that I, GEORGE R. KING, a citizen of the United States, residing at New Brighton, in the county of Richmond and State of New York, have invented a new and useful Multiple Sand and Gravel Screen and Washer, of which the following is a specification.

It is often the case that the sharpest and otherwise best quality of sand is found intermingled with various grades of gravel and some portions of loam and even clay.

In different uses of gravel, as for concreting, paving, roofing, &c., it is found desirable to have it not only graded in size but free from all loam and clay, while, as to the sand, it is found by experience that to make the best mortar for various uses, especially for plastering walls and ceilings, it is necessary not only to free it of all dirt, loam, and clay, but also to take out a portion of the extremely fine sand itself, as it is possible for even sand to be too fine to make the strongest mortar; hence the importance not only of properly screening but thoroughly washing the sand, to accomplish which, as well as grading and washing the accompanying gravel, constitutes the general object of my invention.

Another object of my improvement is to attain the desired results without greatly augmenting the cost of the sand and gravel thus screened, graded, and washed, as the various uses of the same will not warrant it.

I have found by extensive experience that to attain such results as above mentioned much depends upon not only an abundant supply of water but also upon the mode of applying it as the necessary means not only of thoroughly washing but also as an indispensable agent, coequal with the screens, for separating and grading the sand and gravel, as well as facilitating the passage of the same through the screens, and so hastening the work and cheapening the products.

The objects above enumerated I attain by the mechanism illustrated in the accompanying drawings, consisting of three sheets, in which—

Figure 1 represents a vertical section on the line 1 1 in Fig. 4; Fig. 2, an enlarged detail showing the attachment of the screens B B B to the aprons C C C at the discharge ends of the screens and how they are vertically held by the frame A A A and are free at this end to take a lengthwise horizontal movement; Fig. 3, an elevation giving a rear view; Fig. 4, a view on the line 4 4 in Fig. 1, and Fig. 5 a view on the line 5 5 in Fig. 1.

A A A is a right-angular rigid frame, between the uprights of which are placed the several screens and returning-aprons; B B B, a series of screens placed vertically over each other, each screen having a different-sized mesh from the others; C C C, a series of returning-aprons.

D D are two upright lifting-beams, to which the receiving ends of the screens are attached and by which they are vertically and horizontally operated; G G G, returning-aprons, each receiving the materials that fall through the screen above it and conveying them to the receiving end of the screen next below it; c c c, connecting-bars which rigidly hold and fasten together the discharging end of the apron to the receiving end of the screen above it; a a a, bearing-cleats fastened to the side boards of the screens, which cleats rest and work on the antifriction supporting-rollers b b b (best seen in the enlarged drawing, Fig. 2) fastened to the inside of the left-hand uprights of the rigid frame A A A to afford a free and easy lengthwise horizontal movement of the screens and aprons; E E, two cams, mounted on the cam-shaft e e, for lifting and dropping the lifting-beams D D; H, a driving-pulley on the cam-shaft, actuated by the belt H'; F F, pendants or hangers from the top of the frame A A A for carrying the cam-shaft; G G, antifriction-rollers mounted on the roller-shaft g g, and upon which rollers the cams act—the roller-shaft passing through the top of the lifting-beams D D, (clearest seen in Figs. 1 and 4;) d d d, connecting-links between the right-hand uprights of the rigid frame A A A and the lifting-beams D D, the receiving ends of the screens being held by the lifting-beams; J J, the lower portion of the receiving-hopper; 1, 2, 3, 4, 5, and 6, end views of sluices for receiving and conveying to their respective receptacles or bins the different grades of material; K K, a stand-pipe for supplying wash-water; L, a horizontal pipe from the stand-pipe, having an upward opening in the throat of the receiving-hopper; M, N, O, P, and Q, horizontal pipes from the stand-pipe to furnish each screen with wash-water. (Best shown in Fig. 1.)

Having pointed out the several parts of the mechanism of my device by the letters and numerals of designation, I will now explain the operation and advantages of my invention.

As each of the screens and its returning-apron underneath are rigidly fastened together, whatever movement is given to either of the screens is also simultaneously given to its apron, and, all the screens having a common connection with the lifting-beams D D, whatever vertical and lengthwise horizontal movement is given to one screen and its apron is simultaneously given to all the screens and aprons. By elevating the lifting-beams D D in the same vertical plane in which they stand in the drawings, Fig. 1, it gives each screen and apron a lengthwise horizontal movement to the right; but the links $d\ d\ d$ (which connect the right-hand rigid uprights of the frame A A A and the lifting-beams D D) having a fixed point at $d'\ d'\ d'$ the lifting-beams themselves, when raised, are carried to the right, which further increases the horizontal movement of the screens and aprons. Furthermore, when the lifting-beams are elevated far enough to carry the said connecting-links above the horizontal lines passing through their fixed points $d'\ d'\ d'$ it gives all the screens and aprons a slight horizontal movement to the left or in the opposite direction, whereby all the screens and aprons are given lengthwise (first from left to right and then from right to left) a shaking motion every time the lifting-beams D D are elevated and dropped, and every time the lifting-beams are elevated and suddenly dropped a jarring or concussionary action is also given to all the screens and aprons. The frequency and force and consequently the effectiveness of these horizontal movements and concussionary action will, of course, depend upon the rapidity with which the lifting-cams E E are revolved, which preferably would be as rapidly as the lifting-beams will fall under the force of gravity. The concussionary action is produced by the lifting-beams dropping on a solid foundation at the bottom. Of course the extent of the horizontal motions and the intensity of the concussionary action depend upon the extent of the elevation and drop of the lifting-beams D D, which in turn will depend upon the amount of eccentricity of the lifting-cams E E. The mixed material is first wet and powerfully acted upon by an abundant and forcible upward stream of water discharged into the throat of the receiving-hopper J J from the pipe L, and as it (the mixed material) passes some over and some through the several screens it is met and acted upon by other and forcible streams of water thrown horizontally upon the screens and material from the pipes M, N, O, P and Q, one of which streams is discharged upon each screen and the material that passes over and through it. The object of employing so much water and discharging it under high pressure is not only to thoroughly wash the different grades of material but to utilize such streams to act mechanically thereon to separate them from each other and facilitate their passage through their respective screens. The topmost of the series of screens is the coarsest and the bottom one the finest. As the mixed material falls upon and passes some over and some through the topmost screen it takes out and delivers into the sluice 1 only the coarsest grade of stuff—such, for instance, as is employed for concreting—while all the rest of the material passes through the top screen and falls on the conveying-apron next below and attached to it and therefrom is discharged upon the elevated end of the next screen below; and from this second screen (from the top) is discharged the next grade of material into the sluice 2, such as is used for roofing and other purposes, while all the balance of it passes through this second screen and falls on the apron next below and attached to it, and therefrom is discharged on the elevated end of the next screen below, and so on, until the finest grade of material next to sand, which is the finest gravel, known as "grits," is discharged from the bottom and finest screen into the sluice 5, and the finest material of all, being the sand, passes through the bottom screen into the sluice 6, the very fine particles of sand, too fine for use, being carried off with the dirt and clay by the abundant supply and action of the wash-water. By this peculiar method of arranging the screens and aprons one above another and the described method of employing water, the greatest amount of the water acts upon the sand, which of all the grades of material requires the most thorough washing, while the least body of water acts upon the coarsest material which requires the least washing.

By the mechanical as well as washing effect of such an application of an abundance of water, together with the peculiar simultaneous horizontal shaking and concussionary actions of the series of screens and aprons, and a sufficiently rapid rotation of the cams, the machine and work by it can be forced to a high pitch of action.

As the receiving ends of the screens are held to the lifting-beams D D by a simple rod of iron passing through the said beams and the side boards of the screens, and as the links $d\ d\ d$, which form the working connection between the uprights of the rigid frame and the lifting-beams, work freely on simple bolts, and as the discharging ends of the screens are supported by and move horizontally on antifriction-rollers, (see $b$, Fig. 2,) and as the lifting-cams E E work against antifriction-rollers G G, there is, therefore, no great amount of friction to be overcome or any rapid wear to any part of the device, which in the construction of machines for handling sand and gravel is a desideratum.

Having described the construction and explained the operation and advantages of my invention, what I claim as new and useful, and desire to secure by Letters Patent, is—

1. In a sand and gravel separating machine, the connecting links $d\ d\ d$ having a fixed point of action at their attachment $d'\ d'\ d'$ on the rigid frame A A A and their movable ends fastened to the lifting beams D D, whereby the lifting beams as they are raised and dropped will also be moved to the right and left and thus give to all the screens and aprons a lengthwise horizontal shaking motion, as and for the purpose set forth.

2. For separating sand and gravel, the combination of the rigid frame A A A lifting beams D D connecting links $d\ d\ d$ lifting cams E E screens B B B and aprons C C C, substantially in the manner and for the purpose described.

GEORGE R. KING.

Witnesses:
JEROME S. KING,
A. W. MITCHELL.